(12) United States Patent
Matsuoka

(10) Patent No.: US 7,579,982 B2
(45) Date of Patent: Aug. 25, 2009

(54) RADAR APPARATUS

(75) Inventor: Katsuji Matsuoka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/035,232

(22) Filed: Feb. 21, 2008

(65) Prior Publication Data

US 2008/0303711 A1    Dec. 11, 2008

(30) Foreign Application Priority Data

Jun. 11, 2007    (JP)    ............................. 2007-153903

(51) Int. Cl.
    *G01S 13/00*    (2006.01)
(52) U.S. Cl. ...................... 342/196; 342/175
(58) Field of Classification Search ............. 342/70–72, 342/196, 175
    See application file for complete search history.

(56) References Cited

U.S. PATENT DOCUMENTS

| | | | | |
|---|---|---|---|---|
| 4,544,927 | A * | 10/1985 | Kurth et al. .................. | 342/373 |
| 5,748,143 | A * | 5/1998 | Melvin et al. ............... | 342/162 |
| 6,121,917 | A * | 9/2000 | Yamada ...................... | 342/128 |
| 7,474,262 | B2 * | 1/2009 | Alland ........................ | 342/371 |
| 2002/0012289 | A1 * | 1/2002 | Gilbert et al. ............... | 367/135 |
| 2003/0048214 | A1 * | 3/2003 | Yu ............................... | 342/16 |
| 2003/0095067 | A1 * | 5/2003 | Howell ........................ | 342/377 |
| 2006/0164294 | A1 * | 7/2006 | Gottwald et al. .............. | 342/70 |
| 2007/0001897 | A1 * | 1/2007 | Alland ......................... | 342/70 |
| 2008/0303711 | A1 * | 12/2008 | Matsuoka ................... | 342/196 |

FOREIGN PATENT DOCUMENTS

| | | | |
|---|---|---|---|
| JP | 54027140 | A * | 3/1979 |
| JP | 04332890 | A * | 11/1992 |
| JP | 10-20034 | A | 1/1998 |
| JP | 2000-284044 | A | 10/2000 |
| JP | 2001-337148 | A | 12/2001 |
| JP | 2004-198312 | A | 7/2004 |
| JP | 2004-363811 | A | 12/2004 |
| JP | 2005-40639 | A | 6/2005 |
| JP | 2006-279668 | A | 10/2006 |

* cited by examiner

*Primary Examiner*—John B Sotomayor
(74) *Attorney, Agent, or Firm*—Sughrue Mion, PLLC

(57) ABSTRACT

A radar apparatus includes: a plurality of receiving antennas disposed at regular spacings; two transmitting antennas which are positioned each at opposed ends of the receiving antennas, and a spacing of which away from the receiving antennas adjacent thereto is a natural number multiple of half a disposition spacing of the plurality of the receiving antennas; and a signal processor which, after the two transmitting antennas transmit electric waves in time divisions, and then one for each of the plurality of receiving antennas receives waves reflected from a target, subjects the obtained received signals to a digital beam forming process, in which case the signal processor, after subjecting the received signals to a fast Fourier transform process in a time direction, carries out a fast Fourier transform process in a space direction.

3 Claims, 9 Drawing Sheets

FIG. 12
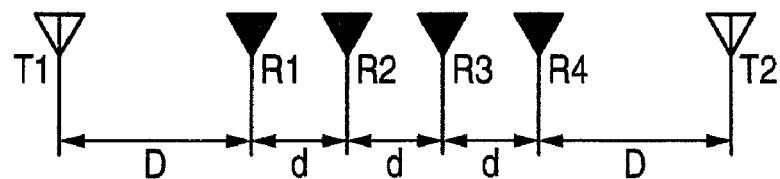
PHASE CORRECTION
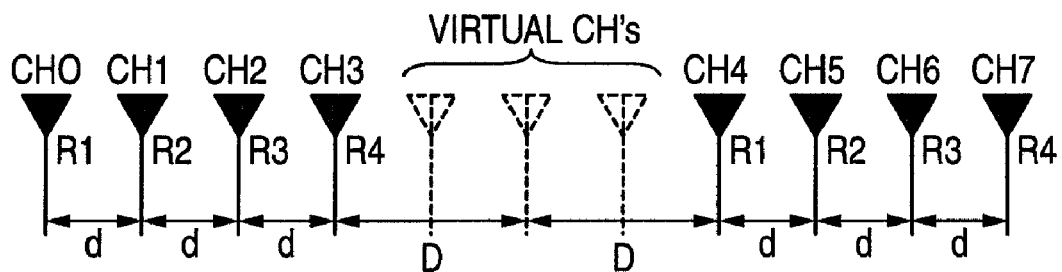

RADAR APPARATUS

BACKGROUND OF THE INVENTION

1. Technical Field

The present invention relates to a radar apparatus which carries out a transmission and reception of an electric wave using a plurality of antennas.

2. Related Art

In general, in a radar apparatus, an angle of a target can be obtained by scanning an antenna beam narrowed down to a desired width. Scanning methods can be divided largely into mechanical scanning methods and electronic scanning methods and, as one electronic scanning method, there is a digital beam forming (hereafter abbreviated as a DBF).

The DBF is a method in which an electric wave transmitted from a transmitting antenna and reflected off the target is received by a plurality of receiving antennas at one time, and various antenna patterns are formed by a digital signal processing, using the received signals. It is conceivable that, in a heretofore known phased array type antenna, a function of an analog phase shifter equipped on each antenna, and a function of analogically synthesizing outputs from the analog phase shifter, are realized, in the DBF, by the digital signal processing.

According to the DBF, as it is not necessary to drive the antennas as in the mechanical scanning method, there is no need for a drive mechanism and, for this reason, it has features of being resistant to vibration, and being able to achieve a reduction in size and weight. Also, in comparison with the phased array type antenna, as there is no need for the analog phase shifter, it has a feature of being able to achieve a reduction in costs.

In general, it has been known that, in a case of obtaining the angle of the target by means of the DBF, the larger an antenna aperture diameter, the superior an angular resolution. However, the angular resolution has a limitation under a constraint such as disposing the radar apparatus in a limited space. Therein, JP-A-2004-198312 discloses a method which, by providing two transmitting antennas, one at either end of the plurality of receiving antennas, transmitting electric waves from the two transmitting antennas in time divisions, and implementing the DBF using each reception result, realizes an equivalent aperture approximately twice as large, and enhances the angular resolution.

A description will be given, using FIG. 11, regarding a fact that it is possible, by transmitting the electric waves from the two transmitting antennas in time divisions, to equivalently increase the aperture. In FIG. 11, a left half of the figure shows, by dotted lines, equal phase planes of an electric wave incident on each receiving antenna R1 to R4 at a transmitting antenna T2 transmission time, and a right half, at a transmitting antenna T1 transmission time. Herein, a case is assumed in which the received waves return from a direction of θ on a right side from a front direction. A transmission/reception path difference of electric waves incident on the receiving antennas R1 to R4, with T2 as a reference at the transmitting antenna T2 transmission time, is as follows.

| | |
|---|---|
| R1 | +4Δr |
| R2 | +3Δr |
| R3 | +2Δr |
| R4 | +Δr |

Herein, in the event that a receiving antenna spacing is d, the path difference is expressed by $$\Delta r = d \sin \theta$$

Meanwhile, a transmission/reception path difference of electric waves incident on the receiving antennas R1 to R4 with T2 as a reference at the transmitting antenna T1 transmission time, as the transmission path difference is +5Δr, is as follows.

| | |
|---|---|
| R1 | +9Δr |
| R2 | +8Δr |
| R3 | +7Δr |
| R4 | +6Δr |

Therefore, a transmission/reception phase difference with the transmitting antenna T2 as the reference can be expressed as follows.

At the T2 transmission time,

| | |
|---|---|
| R1 | −4Δφ |
| R2 | −3Δφ |
| R3 | −2Δφ |
| R4 | −Δφ |

At the T1 transmission time,

| | |
|---|---|
| R1 | −9Δφ |
| R2 | −8Δφ |
| R3 | −7Δφ |
| R4 | −6Δφ |

Herein, regarding a virtual alignment of a position of the transmitting antenna T1 with T2, it is sufficient that the transmission/reception phase difference in the receiving antennas R1 to R4 at the transmitting antenna T1 transmission time is made +10Δφ (a phase correction).

At this time, the phase difference being as follows at the T1 transmission time,

| | |
|---|---|
| R1 | +Δφ |
| R2 | +2Δφ |
| R3 | +3Δφ |
| R4 | +4Δφ | it is possible to virtually treat a receiving antenna disposition in such a way that a total of eight receiving antennas are disposed sandwiching the transmitting antennas T2/T1. That is, although there actually are only four receiving antennas, it is possible to virtually realize approximately twice the antenna aperture diameter, and to enhance the angular resolution.

In the DBF, in order to form beams in a desired orientation direction, it is necessary to phase correct each received signal obtained by the plurality of receiving antennas but, as a common technique thereof, there is a discrete Fourier transform (hereafter abbreviated as a DFT). In a case of forming beams in a plurality of orientation directions, it follows that the DFT is repeatedly executed assuming one direction, and then another direction, meaning that a calculation amount increases in the event that there are many directions to be assumed.

Meanwhile, as a fast Fourier transform (hereafter abbreviated as an FFT) is an algorithm which can carry out the DFT at a high speed, from a viewpoint of the calculation amount, it is desirable to use the FFT in the DBF. This is because, in the event that a signal length is N, the calculation amount of the FFT is proportional to N log N, while a Fourier transform which is not speeded up is proportional to $N^2$.

In a case of providing the two transmitting antennas, one at either end of the plurality of receiving antennas, such as one shown in JP-A-2004-198312, as shown in FIG. 12, an equivalent receiving antenna disposition becomes a kind of condition in which an empty space equivalent to twice a transmitting and receiving antenna spacing D is formed between CH3 and CH4. Herein, in order to differentiate signal outputs corresponding to the receiving antennas R1 to R4 at the transmitting antenna T1 transmission time from signal outputs corresponding to the receiving antennas R1 to R4 at the transmitting antenna T2 transmission time, channels (CH's) are defined as follows.

At the transmitting antenna T2 transmission time,

| | |
|---|---|
| R1 | CH0 |
| R2 | CH1 |
| R3 | CH2 |
| R4 | CH3 |

At the transmitting antenna T1 transmission time,

| | |
|---|---|
| R1 | CH4 |
| R2 | CH5 |
| R3 | CH6 |
| R4 | CH7 |

In a case of a receiving antenna disposition such as one shown in FIG. 12, in the event of intending to implement the DBF using the FFT, a form is taken in which virtual CH's are disposed between CH3 and CH4 at the same spacings as the receiving antenna spacing d, and the virtual CH's are zero-filled. However, as a CH disposition including the virtual CH's becomes unequally spaced depending on how the transmitting and receiving antenna spacing D is done, it is impossible to apply the FFT, and it is necessary to implement the DFT. That is, there is a problem of causing an increase of the calculation amount.

SUMMARY OF THE INVENTION

The invention, having been conceived in order to solve the heretofore described kind of problem, has an object of providing a radar apparatus capable of, by equivalently increasing an aperture diameter with a limited antenna size, enhancing an angular resolution, and reducing a calculation amount.

A radar apparatus according to a first aspect includes: a plurality of receiving antennas disposed at regular spacings; two transmitting antennas which are positioned each at opposed ends of the receiving antennas, and a spacing of which away from the receiving antennas adjacent thereto is a natural number multiple of half a disposition spacing of the plurality of the receiving antennas; and a signal processor which, after the two transmitting antennas transmit electric waves in time divisions, and then one for each of the plurality of receiving antennas receives waves reflected from a target, subjects the obtained received signals to a digital beam forming process. In this case, the signal processor, after subjecting the received signals to a fast Fourier transform process in a time direction, carries out a fast Fourier transform process in a space direction.

According to a radar apparatus of a second aspect, in the radar apparatus of the first aspect, a dummy antenna is disposed between the receiving antennas and each transmitting antenna.

According to a radar apparatus of a third aspect, in the radar apparatus of the second aspect, a spacing between each dummy antenna and the receiving antenna adjacent thereto is made equal to the disposition spacing of the plurality of receiving antennas.

The radar apparatus of the aspects of the invention has an advantage that, by equivalently increasing the aperture diameter with the limited antenna size, it is possible to enhance the angular resolution, and reduce the calculation amount. Also, as it is possible to dispose the dummy antennas between the transmitting and receiving antennas, and unify amplitude and phase characteristics of the receiving antennas, it is possible to reduce errors during a calculation of an angle of the target.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram for illustrating a problem which the invention is to solve.

DETAILED DESCRIPTION

First Embodiment

Figure 1:
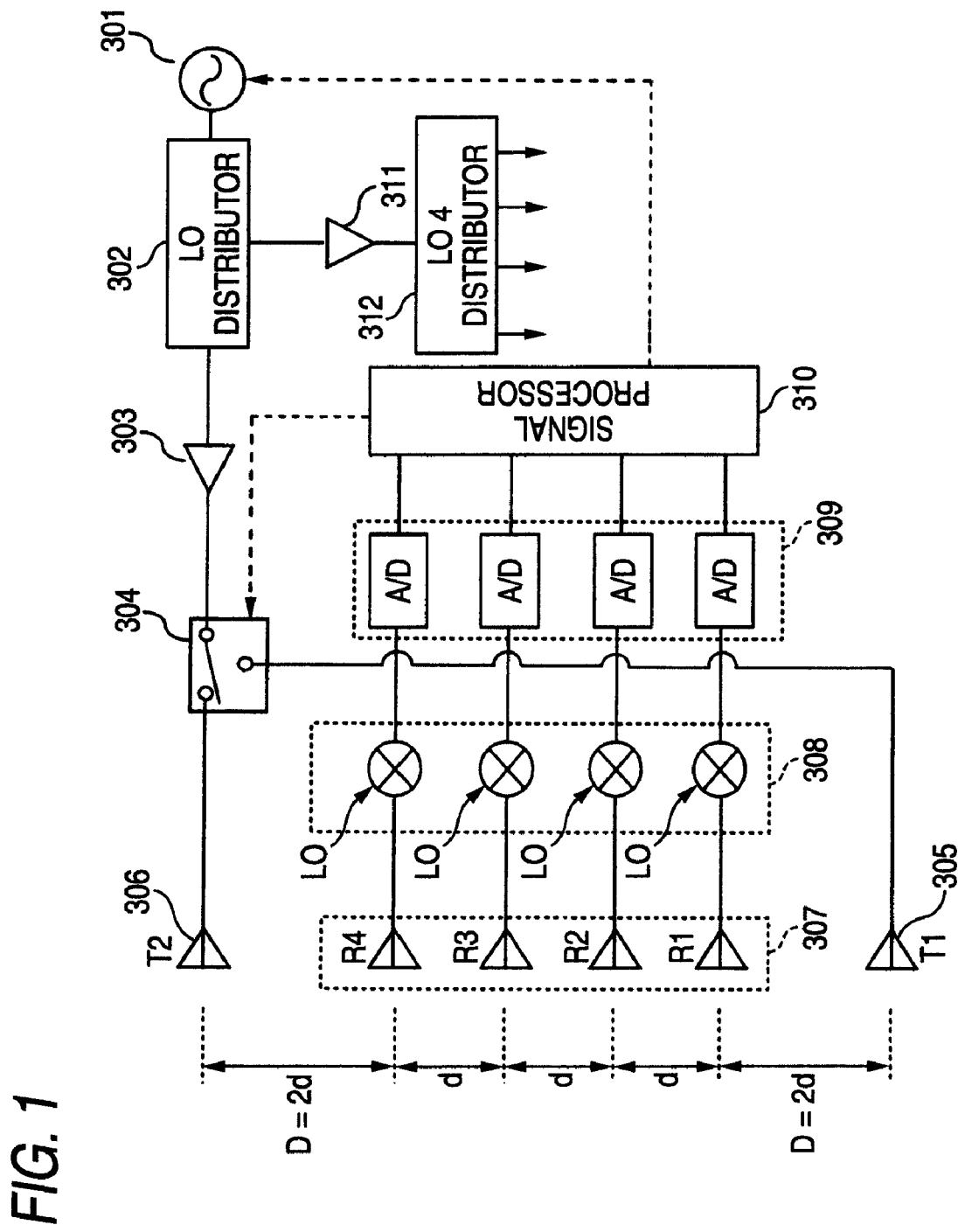
FIG. 1 is a diagram showing a configuration of a radar apparatus according to a first embodiment of the invention.

A description will be given of a first embodiment corresponding to the first aspect of the invention. FIG. 1 showing a radar apparatus according to the first embodiment, the radar apparatus includes a first transmitting antenna 305 (T1) and a second transmitting antenna 306 (T2), switched between by a transmitting switch 304. Receiving antennas 307, configured of a plurality (in the embodiment, four) of receiving antennas R1, R2, R3 and R4, are disposed between the first and second transmitting antennas 305 and 306 (T1 and T2). The receiving antennas R1 to R4 are disposed at regular spacings d. The transmitting antennas 305 (T1) and 306 (T2), positioned on either side of the receiving antennas R1 to R4, are spaced a spacing D=2d away from the respective adjacent receiving antennas R1 and R4 positioned on either end of the receiving antennas 307.

A connection is made in such a way that a signal generated by a voltage control oscillator (hereafter abbreviated as a VCO) 301 is distributed by an LO distributor 302 and, after being amplified by an amplifier 303, is applied to the first transmitting antenna 305 (T1) and the second transmitting antenna 306 (T2) via the transmitting switch 304.

R1 to R4 of the receiving antennas 307 are connected to mixers 308, furthermore, the mixers 308 are connected to analog/digital converters (hereafter abbreviated as A/D converters) 309, and further still, the A/D converters 309 are connected to a signal processor 310.

An LO 4 distributor 312 is connected to the LO distributor 302 via an amplifier 311, and outputs distributed into four parts by the LO 4 distributor 312 are supplied to the mixers 308.

First, a transmitting operation will be described. A voltage changing temporally in triangular waves is generated by the signal processor 310, and applied to the VCO 301. The VCO 301 generates a frequency modulated continuous wave (hereafter abbreviated as an FMCW), of which a frequency changes temporally in accordance with the applied voltage, and inputs it into the LO distributor 302. The LO distributor 302 outputs a portion of the input FMCW as a transmitted signal, and the output transmitted signal, after being amplified by the amplifier 303, is input into the transmitting switch 304. The transmitting switch 304, as well as pulse modulating the input FMCW, also assumes a role of switching between the first transmitting antenna 305 (T1) and the second transmitting antenna 306 (T2) at a predetermined timing. The first transmitting antenna 305 (T1) or the second transmitting antenna 306 (T2) radiates the input transmitted signal into space as a transmitted wave.

Meanwhile, the LO distributor 302 outputs the remaining FMCW as a local signal, and the output local signal, after being amplified by the amplifier 311, is input into the LO 4 distributor 312. The outputs distributed into four parts by the LO 4 distributor 312 are supplied to the mixers 308.

Next, a receiving operation will be described. The electric wave radiated from the first transmitting antenna 305 (T1) or the second transmitting antenna 306 (T2) is reflected off a target, and input into the receiving antennas 307 (R1 to R4) with a lag time corresponding to a distance to the target. Subsequently, the electric wave is mixed with the FMCW from the LO 4 distributor 312 by the mixers 308, and beat signals are output. The obtained beat signals are input into the A/D converters 309 and converted to digital signals, and the digital signals are input into the signal processor 310.

Next, a detailed description will be given of each timing, using FIGS. 2A to 2F. In FIGS. 2A to 2F, FIG. 2A shows the FMCW output from the heretofore described VCO 301. In FIGS. 2A to 2F, a description will be given, focusing on a down chirp from among the FMCW. The radar apparatus in the embodiment, as it has the FMCW subjected to the pulse modulation, sets range gates (0 to N) on a receiving side, and samples a beat signal for each range gate.

Figure 2:
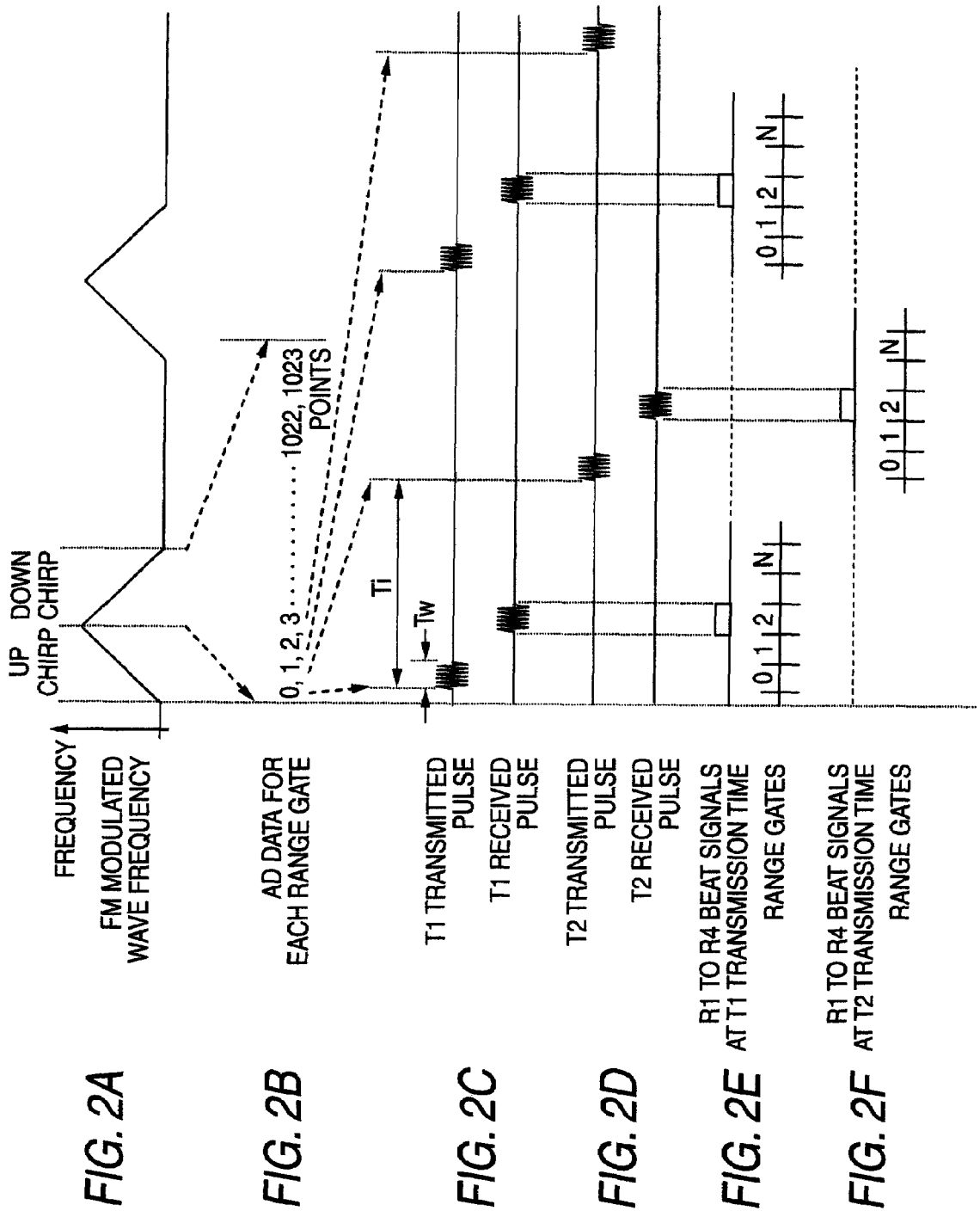
FIGS. 2A to 2F are diagrams for illustrating each timing of the first embodiment.

As shown in FIG. 2B, it is possible, during a period of the down chirp, to obtain a total of 1024 points of AD data for each range gate. Hereafter, a breakdown thereof will be described. FIG. 2C shows a transmitted pulse at a time of transmission from the first transmitting antenna 305 (T1) (a T1 transmitted pulse), and a received pulse at that time (a T1 received pulse). Meanwhile, FIG. 2D shows a transmitted pulse at a time of transmission from the second transmitting antenna 306 (T2) (a T2 transmitted pulse), and a received pulse at that time (a T2 received pulse). In the figures, Tw indicates a pulse width, and Ti a pulse spacing. In this way, the transmitting switch 304 being caused to switch alternately, an AD sampling is carried out with respect to the received pulse at the time of transmission from each antenna.

FIG. 2E shows beat signals and range gates received by the receiving antennas (R1 to R4) at the time of transmission from the first transmitting antenna 305 (T1). Meanwhile, FIG. 2F shows beat signals and range gates received by the receiving antennas (R1 to R4) at the time of transmission from the second transmitting antenna 306 (T2).

In this way, it is possible to obtain 512 points of AD data for each range gate, either at the time of transmission from the first transmitting antenna 305 (T1), or at the time of transmission from the second transmitting antenna 306 (T2).

Figure 3:
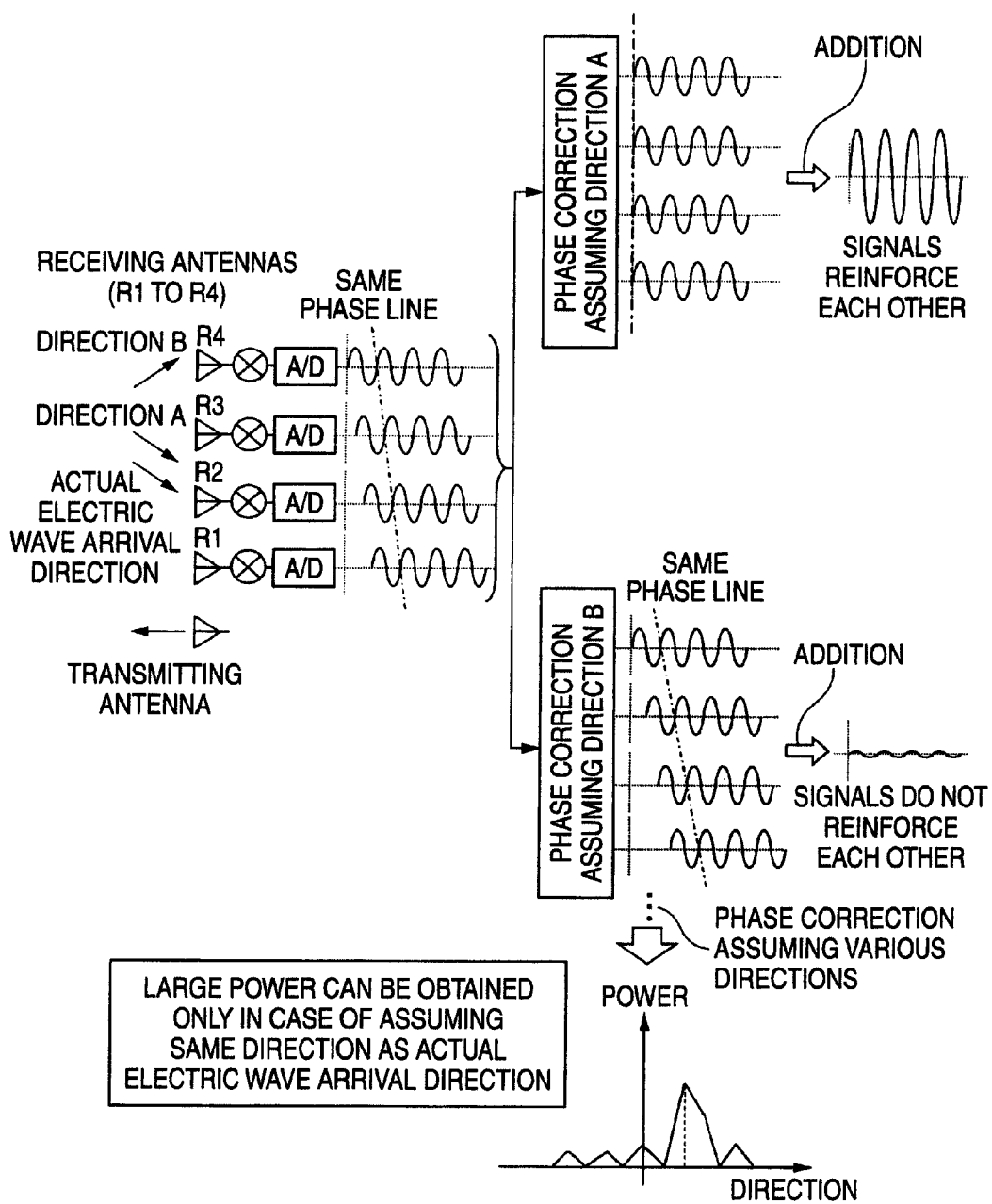
FIG. 3 is a diagram for illustrating a DBF principle.

Next, a detailed description will be given of a DBF principle. FIG. 3 schematically shows the DBF principle. Herein, let us consider a case of one transmitting antenna and four receiving antennas (R1 to R4). In the event that an actual electric wave arrival direction is a direction angled from a front direction, waveforms output from the A/D converters corresponding to the receiving antennas take on a condition in which they have a phase difference depending on electric wave arrival angles.

Now, assuming a direction A which is the same direction as the actual electric wave arrival direction, in a case of making a phase correction according thereto, phase corrected waveforms corresponding to the receiving antennas become uniform in phase and, upon subjecting them to an addition process, signals reinforcing each other, it is possible to obtain a large amplitude (FIG. 3). Meanwhile, assuming a direction B which differs from the actual electric wave arrival direction, in a case of making a phase correction according thereto, phase corrected waveforms corresponding to the receiving antennas are not made uniform in phase and, upon subjecting them to the addition process, signals do not reinforce each other, resulting in a signal having a small amplitude (FIG. 3). In this way, assuming various directions, in a case of making phase corrections according thereto, and adding signals corresponding to the receiving antennas, it is possible to obtain a high power only in the case of assuming the same direction as the actual electric wave arrival direction.

Figure 4:
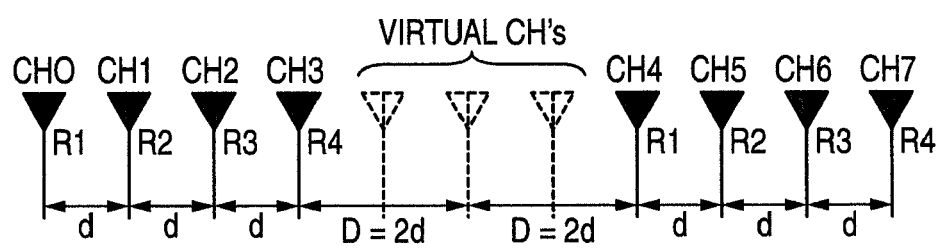
FIG. 4 is a diagram for illustrating an application of an FFT to a DBF.

Next, let us consider a case in which an FFT is used in a DBF of the transmitting antenna switching type radar shown in FIG. 1. As described heretofore, it is possible, by means of the transmitting antenna switching and the phase corrections, to virtually treat the receiving antenna disposition as a disposition of eight receiving antennas. As shown in FIG. 1, in the event that a spacing between either transmitting antenna and the receiving antenna closest thereto is D (=2d), and a spacing between adjacent receiving antennas is d, the virtual disposition of the eight receiving antennas, as shown in FIG. 4, takes on a kind of condition in which a gap 2D is formed in a center of the receiving antennas.

In a case of intending to carry out the DBF using the FFT in the receiving antennas with this kind of disposition, it follows that virtual CH positions are zerofilled. In order to do so, it is necessary that a transmitting and receiving antenna spacing 2D meets the following condition.

2D=natural number multiple of d in other words,

D=natural number multiple of (d/2)

and, it is necessary to make the transmitting and receiving antenna spacing a natural number multiple of half the receiving antenna spacing.

Figure 5:
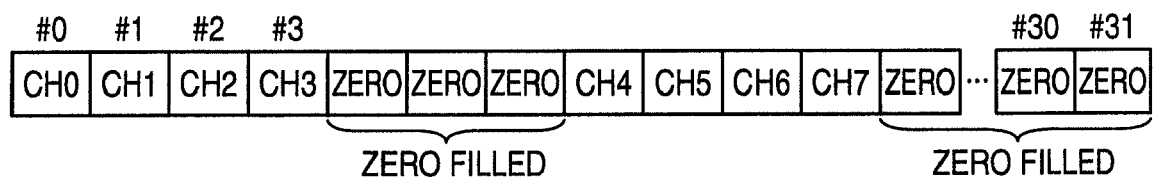
FIG. 5 is a diagram for illustrating the application of the FFT to the DBF.

FIG. 5 shows CH's and a zerofilled disposition in the event that there are, for example, 32 assumed beam orientation directions. The DBF using the FFT can be obtained by giving in advance, and integrating, a rotation of a phase shifter corresponding to a predetermined beam orientation direction, and searching for a maximum value in all the beam orientation directions. In the event that a number of FFT points is N, and the receiving antenna spacing is d, an orientation direction θm of an mth beam can be obtained by Equation 1.

$$\theta_m = \sin^{-1}\left(\frac{m\lambda}{Nd}\right) - \frac{N}{2} < m < \frac{N}{2} \quad \text{(Equation 1)}$$

Figure 6:
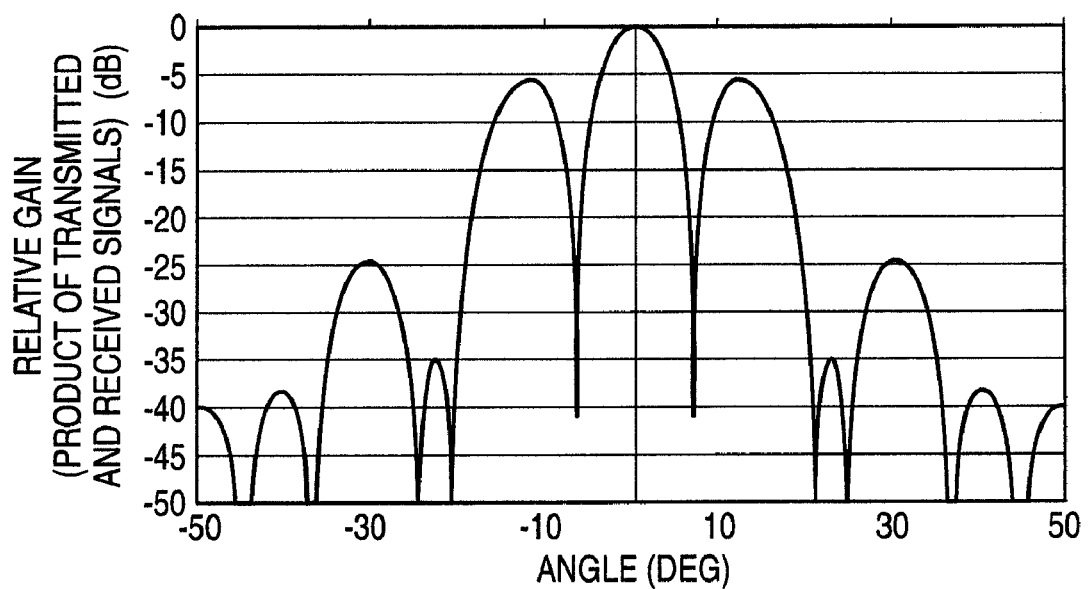
FIG. 6 is a diagram showing an example of a DBF synthesis pattern.

FIG. 6 shows, as an example, a front direction DBF synthesis pattern in a case of executing a 32 point FFT. Although synthetic patterns for 32 directions can be obtained as outputs in the case of carrying out a DBF synthesis using the 32 point FFT, herein, FIG. 6 shows a synthesis pattern for one direction (the front direction) from among them.

Figure 7:
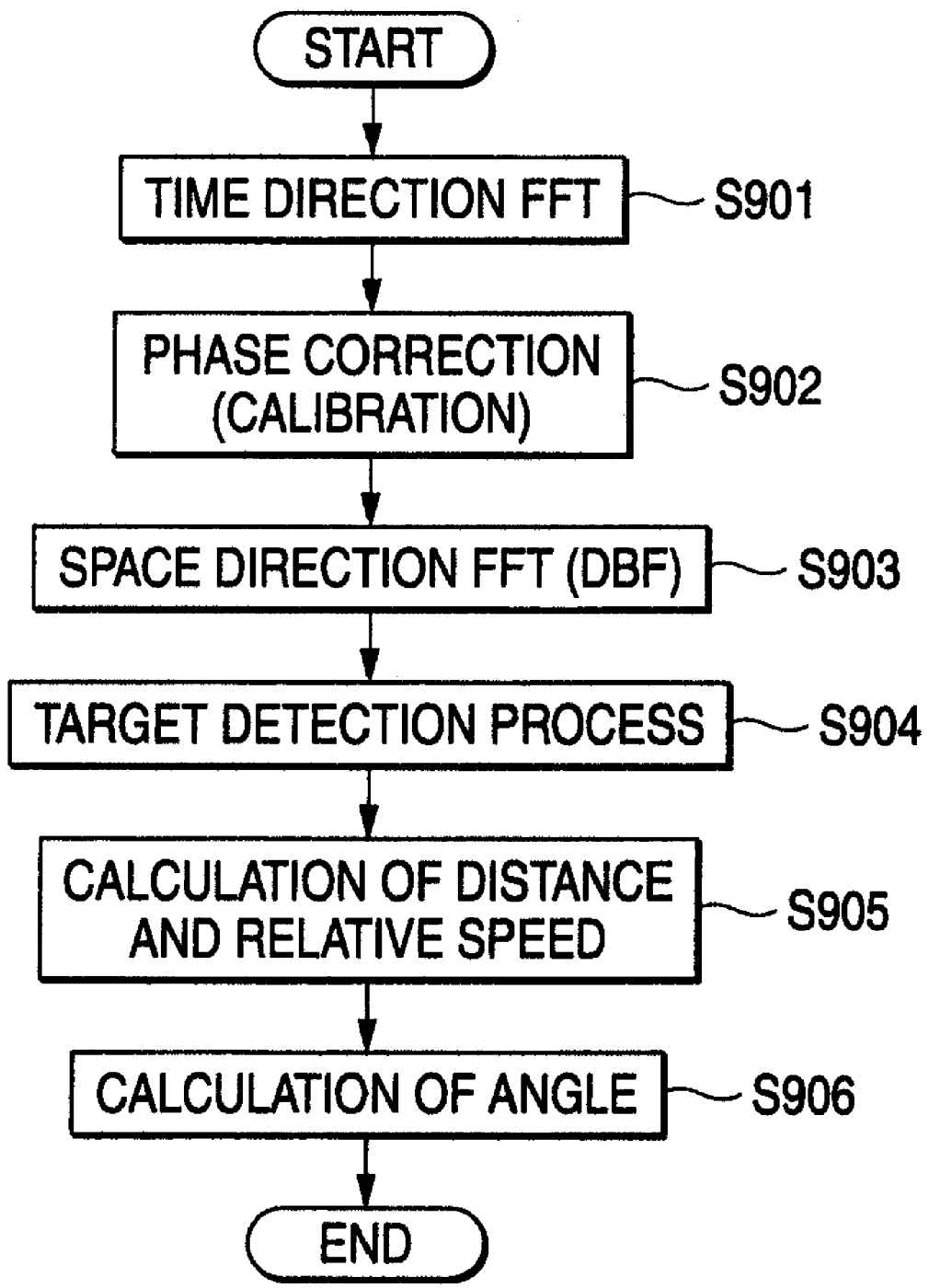
FIG. 7 is a flowchart for describing a flow of a signal processing of the first embodiment.

Next, a flow of a signal processing will be described using a flowchart of FIG. 7. Hereafter, a description will be given of each step. First, in S901, the FFT (a 512 point FFT) is implemented in a time direction with respect to beat signals obtained on receiving channels CH0 to CH7. In the process, the FFT is further implemented with respect to each range gate (0 to N) in each chirp (up or down).

Next, a phase correction process is carried out in S902. As used herein, the phase correction process, not being for aligning positions of the heretofore described two transmitting antennas, refers to a phase correction for which a hardware (H/W) related phase error of each receiving antenna (R1 to R4) or the like, and a switching timing of the transmitting antennas, are taken into account (a phase calibration). The phase calibration is carried out with respect to all frequency bins of a time direction FFT result which is an output from S901.

In S903, a space direction FFT (the DBF) is implemented. The DBF is implemented with respect to all frequency bins of a phase corrected FFT result which is an output from S902. A technique of the DBF is as described heretofore.

Next, in S904, a target detection process is carried out. A detection threshold is set for a level after the DBF and, if the level is higher than or equal to the detection threshold, it is determined that a target has been detected.

In S905, a distance and a relative speed of the target detected in S904 are calculated. Specifically, the distance and the relative speed are calculated by carrying out a combination process with respect to a frequency spectrum detected in the up chirp and the down chirp. The process is a basic process of the FMCW and, as it has already been made public in various documents, details thereof will be omitted.

In S906, an angle of the target detected in S904 is calculated. As described heretofore, the angle of the target can be obtained generally by scanning an antenna beam narrowed down to a desired width. In the case of the embodiment, a plurality of antenna beams can be formed in a predetermined direction by means of the DBF. In order to obtain the angle of the target, for example, as an easiest method, a beamformer method is applied which searches for a direction in which a received power of the antenna beam reaches its maximum. However, in this case, a resolution limit given by "wavelength/antenna opening diameter" gives rise to a need to increase an antenna aperture diameter in order to enhance an accuracy.

Also, it is acceptable to apply a method, such as a monopulse method, in which an angle at which a phase difference or an amplitude difference of a plurality of receiving antennas reaches 0 is made an incidence angle. In the monopulse method, although it has a higher accuracy than the beamformer method, in the event that a plurality of targets exist, an angle measuring performance deteriorates drastically due to an interference of electric waves received from them.

Furthermore, as a method in which it is possible, using this DBF antenna, to estimate incidence angles of a plurality of electric waves of an identical frequency band, with a high accuracy, by means of a more complicated signal processing which uses a correlation of a plurality of digital received signals, it is also acceptable to apply a MUSIC (Multiple Signal Classification) algorithm, or ESPRIT (Estimation of Signal Parameters via Rotational Invariance Techniques) which is an algorithm derived therefrom. These methods are called super resolution angle measuring algorithms because they can separate and angle-measure a plurality of waves with angles closer in value to each other than the "wavelength/antenna aperture diameter" which is the resolution limit of the antenna beams.

Although, as described heretofore, there are various methods of the target angle calculation, in any method, in order to enhance the accuracy and the resolution, it is effective to increase the antenna aperture diameter.

As above, according to the embodiment, the radar apparatus is configured of the two transmitting antennas and the plurality of receiving antennas and, as it is possible, by transmitting the electric waves from the two transmitting antennas in time divisions, receiving a reflected wave by means of each of the plurality of receiving antennas, and making the phase correction, to virtually increase the antenna aperture diameter, it is possible to enhance the angular resolution. Furthermore, as the transmitting and receiving antenna spacing is made the natural number multiple of half the receiving antenna disposition spacing, it is possible to realize the DBF with a high speed FFT process, meaning that it is possible to reduce a calculation amount.

In general, in the event that an antenna element spacing is one wavelength or greater, a radiation called a grating lobe occurs. In the embodiment, the receiving and transmitting antenna spacing is made 2d and, looking at an equivalent receiving antenna disposition of FIG. 4, a spacing between CH3 and CH4 is one wavelength or greater, providing a condition under which the grating lobe occurs. In FIG. 6, the grating lobe can be seen in a vicinity of about ±12 deg. In the event that the grating lobe occurs, a beam width of a main lobe decreases but, as several drops (nulls) of a radiation pattern occur, in order to cover a predetermined coverage without any reduction in level, it is necessary to increase the number of FFT points of the DBF and narrow the spacing in the beam orientation direction.

Figure 8:
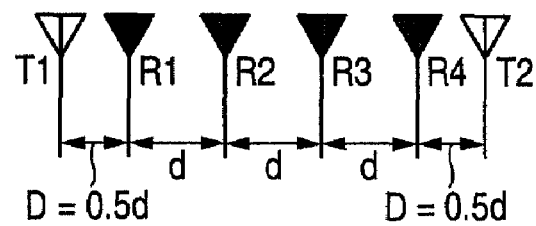
FIG. 8 is a diagram showing another antenna configuration of the first embodiment.
Figure 9:
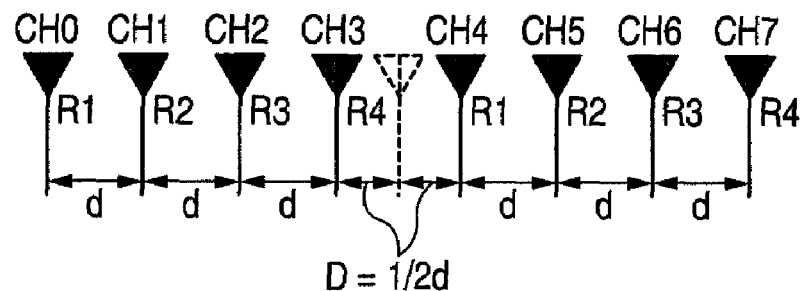
FIG. 9 is a diagram showing a virtual transmitting and receiving antenna spacing of the antenna configuration of FIG. 8.

Therein, as shown in FIG. 8, the spacing between the first transmitting antenna T1 and the receiving antenna R1, and between the second transmitting antenna T2 and the receiving antenna R4, is reduced to half of the receiving antenna spacing. That is, the spacing is set at D=0.5d. By reducing the receiving and transmitting antenna spacing to half of the receiving antenna spacing in this way, as shown in FIG. 9, all the equivalent antenna dispositions become equally spaced and less than one wavelength, and it is possible to avoid the condition under which the grating lobe occurs.

Second Embodiment

A description will be given of a second embodiment corresponding to the second and third aspects of the invention. A configuration of a radar apparatus of the embodiment is the same as that of FIG. 1. Hereafter, a description will be given only of points differing from those of the first embodiment.

In any of the cases of the heretofore described beamformer method, which searches for the direction in which the received power of the antenna beam reaches its maximum after the DBF, monopulse method (using the amplitude or the phase), and super resolution method, which are the methods for the angle calculation, it is desirable that amplitude and phase characteristics of the plurality of receiving antennas are as uniform as possible. This is because, in the event that the amplitude characteristics of the receiving antennas differ from one another, a distortion occurs in the synthesis antenna pattern after the DBF and, in the beamformer method which searches for the direction in which the received power reaches its maximum, an error occurs in an angle measuring value. Also, in the case of the monopulse method too, as an angle at which the phase difference or the amplitude difference between the plurality of receiving antennas reaches 0 is calculated, in the event that there is a fluctuation in the amplitude and phase characteristics of the receiving antennas, it follows that the error occurs in the angle measuring value. Also, in the super resolution method too, as the correlation of the plurality of received signals is used, it is similarly required that the amplitude and phase characteristics of the receiving antennas are as uniform as possible.

Figure 10:
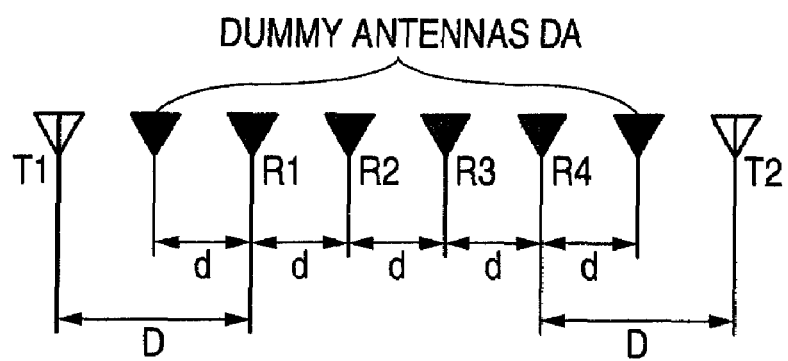
FIG. 10 is a diagram showing an antenna configuration of a radar apparatus according to a second embodiment of the invention.
Figure 11:
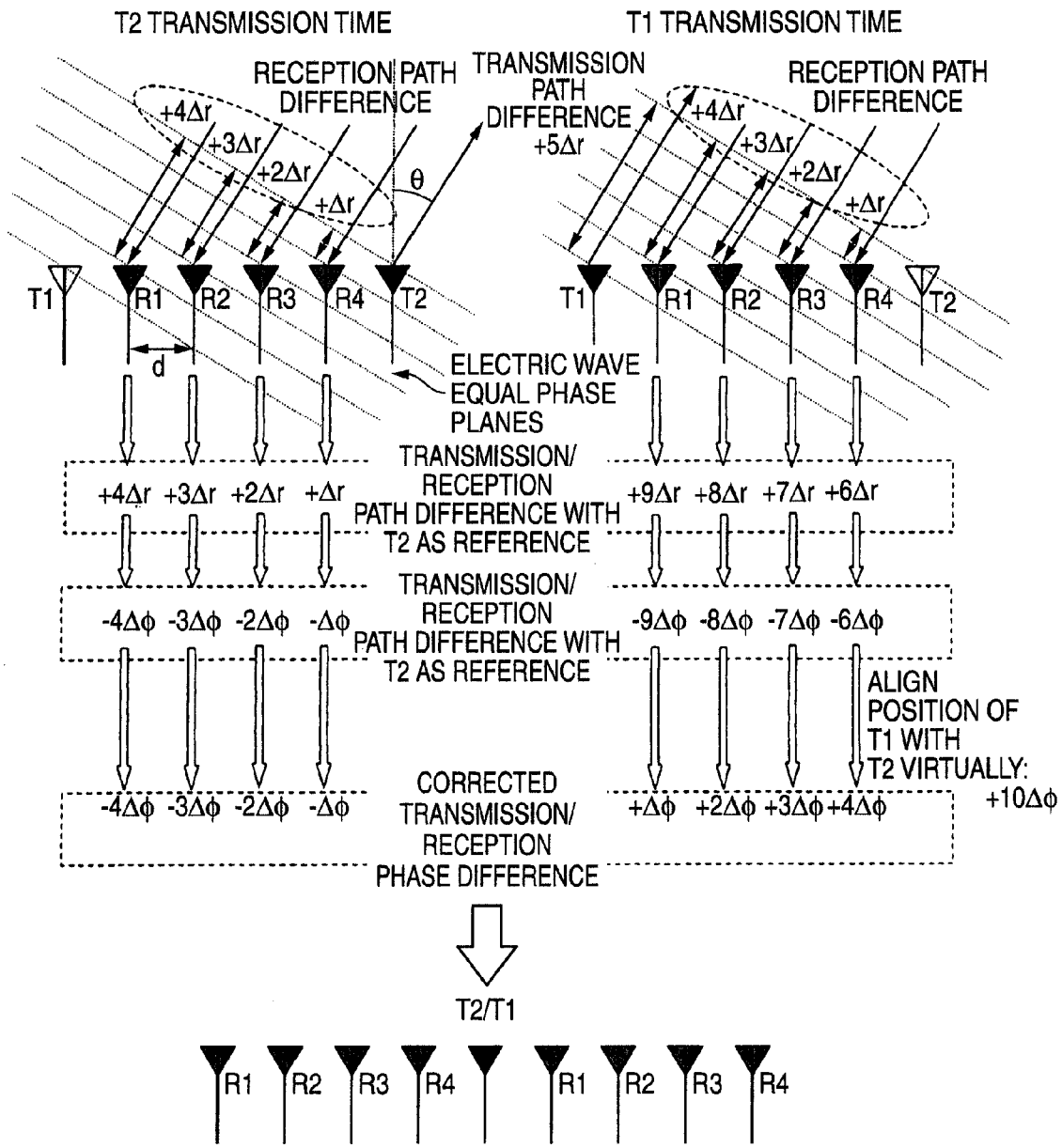
FIG. 11 is a diagram for illustrating a heretofore known radar apparatus.

Therein, in the embodiment, in order to unify the amplitude and phase characteristics of the receiving antennas, as shown in FIG. 10, dummy antennas DA to which no power is fed are disposed between the transmitting antenna T1 and the receiving antenna R1, and between the transmitting antenna T2 and the receiving antenna R4, respectively. It is also acceptable that the dummy antennas DA are terminated. Herein, a spacing between either dummy antenna DA and the adjacent receiving antenna is made the same d as the receiving antenna spacing.

First, let us consider a case in which there is no dummy antenna DA. In FIG. 10, in a case of focusing on the receiving antennas R2 and R3, a receiving antenna is disposed a spacing d away on either side of each one. However, in a case of focusing on the receiving antennas R1 and R4, a receiving antenna being disposed the spacing d away on only one side of each of them, the transmitting antennas T1 and T2 are disposed respectively on the other sides, in positions a spacing D, which is larger than the spacing d, away.

In the case in which the plurality of antennas are disposed, they affect each other's amplitude and phase characteristics due to a connection phenomenon between elements, or the like. Therefore, in order to unify the amplitude and phase characteristics of the receiving antennas, it is desirable to cause disposition conditions of the receiving antennas to conform to each other, and it is effective to dispose the dummy antennas.

As above, according to the embodiment, the dummy antennas being disposed between the transmitting and receiving antennas, it is possible to unify the amplitude and phase characteristics of the receiving antennas, meaning that, in addition to the advantage of the first embodiment, it is possible to reduce the errors during the target angle calculation.

The invention can be applied to, for example, a system which, being loaded on a vehicle, achieves a safety of the vehicle and a convenience of an automated driving.

Various modifications and alterations of this invention will be apparent to those skilled in the art without departing from the scope and spirit of this invention, and it should be understood that this is not limited to the illustrative embodiments set forth herein.

What is claimed is:

1. A radar apparatus comprising:
a plurality of receiving antennas disposed at regular spacings; two transmitting antennas which are positioned each at opposed ends of the receiving antennas, and a spacing of which away from the receiving antennas adjacent thereto is a natural number multiple of half a disposition spacing of the plurality of the receiving antennas; and a signal processor which, after the two transmitting antennas transmit electric waves in time divisions, and then one for each of the plurality of receiving antennas receives waves reflected from a target, subjects the obtained received signals to a digital beam forming process, wherein
the signal processor, after subjecting the received signals to a fast Fourier transform process in a time direction, carries out a fast Fourier transform process in a space direction.

2. The radar apparatus according to claim 1, wherein
a dummy antenna is disposed between the receiving antennas and each transmitting antenna.

3. The radar apparatus according to claim 2, wherein
a spacing between each dummy antenna and the receiving antenna adjacent thereto is made equal to the disposition spacing of the plurality of receiving antennas.

* * * * *